(12) United States Patent
Strange (10) Patent No.: US 12,265,511 B2
(45) Date of Patent: Apr. 1, 2025

(54) METHOD FOR DATABASE-DATABASE INTEGRATION

(71) Applicant: FMR LLC, Boston, MA (US)

(72) Inventor: Nicholas Strange, Cary, NC (US)

(73) Assignee: FMR LLC, Boston, MA (US)

( * ) Notice: Subject to any disclaimer, the term of this patent is extended or adjusted under 35 U.S.C. 154(b) by 0 days.

(21) Appl. No.: 18/209,964

(22) Filed: Jun. 14, 2023

(65) Prior Publication Data

US 2024/0419642 A1 Dec. 19, 2024

(51) Int. Cl.
*G06F 16/00* (2019.01)
*G06F 16/215* (2019.01)
*G06F 16/23* (2019.01)
*G06F 16/27* (2019.01)

(52) U.S. Cl.
CPC ........ *G06F 16/215* (2019.01); *G06F 16/2365* (2019.01); *G06F 16/27* (2019.01)

(58) Field of Classification Search
CPC ..... G06F 16/215; G06F 16/2365; G06F 16/27
See application file for complete search history.

(56) References Cited

U.S. PATENT DOCUMENTS

| 2014/0317087 A1* | 10/2014 | Collins | G06F 16/2455 707/715 |
| 2022/0171788 A1* | 6/2022 | Ito | G06F 9/4881 |
| 2023/0111816 A1* | 4/2023 | Malboubi | G06F 16/278 726/26 |
| 2023/0153314 A1* | 5/2023 | Martin | G06F 16/2282 707/746 |

\* cited by examiner

*Primary Examiner* — Paul Kim
(74) *Attorney, Agent, or Firm* — Cesari and McKenna, LLP (57) ABSTRACT

A method for reconciling data includes separating a first table into a plurality of first chunks, each first chunk including a plurality of first rows, and second table into a plurality of second chunks, each second chunk including a plurality of second rows. Each second chunk corresponds a first chunk. For each first chunk, the method includes: computing a first hash based on the first chunk and a second hash based on a second chunk corresponding to the first chunk; comparing the first hash with the second hash; in response to the first hash being different from the second hash, retrieving the plurality of first rows and the plurality of second rows and comparing the plurality of first rows to the plurality of second rows; in response to the first rows being different from the second rows, generating executable code configured to reconcile the first table with the second table.

17 Claims, 3 Drawing Sheets

METHOD FOR DATABASE-DATABASE INTEGRATION

BACKGROUND

Technical Field

The present invention relates to database integration, and more particularly to reconciling, repairing, and replicating databases of potentially diverse types.

Background

Tables in a database are often replicated or copied to another database. This operation becomes difficult and error-prone when the database systems that provide the source and the target databases are of a different type. Checking for a successful replication of a table and/or reconciling a replicated table with its source may mean comparing millions or trillions of rows. Known reconciliation methods extract data row by row from the source and target databases and then compare the extracted data also row by row. This means that each row's data needs to be transferred from both source and target database servers to the application performing the comparison. Due to the data transfer bottleneck and the comparison operation itself, performing such a row-by-row comparison on large tables, such as tables having a trillion rows or more, is not feasible.

SUMMARY

The deficiencies of the prior art are overcome by providing a method that enables fast and parallel comparison, reconciliation, and validation of data in databases of different types. In accordance with an embodiment of the present invention a computer-implemented method for reconciling a first table in a first database provided by a first database system with a second table in a second database provided by a second database system includes separating, by a computing device communicatively coupled to the first database system and to the second database system, the first table into a plurality of first chunks, each first chunk including a plurality of first rows. The method also includes separating, by the computing device, the second table into a plurality of second chunks, each second chunk including a plurality of second rows, wherein each one of the plurality of second chunks corresponds to one of the plurality of first chunks. The method includes, for each first chunk of the plurality of first chunks, causing, by the computing device, the first database system to compute a first hash based on the first chunk. The method includes, for each chunk of the plurality of first chunks, causing, by the computing device, the second database system to compute a second hash based on a second chunk from the plurality of second chunks corresponding to the first chunk. The method includes, for each chunk of the plurality of first chunks, receiving, by the computing device, the first hash from the first database system and the second hash from the second database system. The method also includes, for each chunk of the plurality of first chunks, comparing, by the computing device, the first hash with the second hash. The method further includes, for each chunk of the plurality of first chunks and in response to a determination that the first hash is different from the second hash, retrieving, by the computing device, the plurality of first rows of the first chunk and the plurality of second rows of the second chunk, and comparing, by the computing device, the plurality of first rows to the plurality of second rows. The method includes, for each chunk of the plurality of first chunks and in response to a determination that the plurality of first rows is different from the plurality of second rows, generating, by the computing device, executable code configured to reconcile the first table with the second table.

Alternatively, or in addition, the second table is a replicated version of the first table generated at a time of replication. The method may further include receiving, by the computing device from the second database system, the time of replication; and causing, by the computing device, the first database system to operate with a version of the first table at the time of replication.

Also alternatively, or in addition, a first row of the plurality of first rows is different from a corresponding second row of the plurality of second rows and the executable code is SQL code configured to update a primary key of the first row. The SQL code may be configured to update a primary key of the first row to itself. A first row of the plurality of first rows may have no corresponding second row in the plurality of second rows and the executable code may be SQL code configured to update a primary key of the first row. The SQL code may be configured to update a primary key of the first row to itself. A second row of the plurality of second rows may have no corresponding first row in the plurality of first rows and the executable code may be SQL code configured to delete the second row from the second table.

Further alternatively, or in addition, the second database system is of a different type than the first database system. At least one of the first database system and the second database system may be a cloud-based database system.

Alternatively, or in addition, the first table includes partitions and the first table is separated into first chunks based on partition boundaries. The first table may include a primary key and the first table may be separated into first chunks based on a portion of the primary key.

In accordance with another embodiment of the present invention, a system for reconciling data includes a first database system providing a first database having a first table. The system includes a second database system providing a second database having a second table. The system also includes a computing device communicatively coupled to the first database system and the second database system and having a first processor coupled to a first memory. The first processor is configured to separate the first table into a plurality of first chunks, each first chunk including a plurality of first rows. The first processor is also configured to separate the second table into a plurality of second chunks, each second chunk including a plurality of second rows, wherein each one of the plurality of second chunks corresponds to one of the plurality of first chunks. The first processor is configured to, for each first chunk of the plurality of first chunks, cause the first database system to compute a first hash based on the first chunk. The first processor is configured to, for each first chunk of the plurality of first chunks, cause the second database system to compute a second hash based on a second chunk from the plurality of second chunks corresponding to the first chunk. The first processor is configured to, for each first chunk of the plurality of first chunks, receive the first hash from the first database system. The first processor is configured to, for each first chunk of the plurality of first chunks, receive the second hash from the second database system. The first processor is configured to, for each first chunk of the plurality of first chunks, compare the first hash with the second hash. The first processor is configured to, for each first chunk of the plurality of first chunks and in response to a determination that the first hash is different from the second hash, retrieve the plurality of first rows of the first chunk and the plurality of second rows of the second chunk, and compare the plurality of first rows to the plurality of second rows. The first processor is configured to, for each first chunk of the plurality of first chunks and in response to a determination that the plurality of first rows is different from the plurality of second rows, generate executable code configured to reconcile the first table with the second table.

Alternatively, or in addition, the second table is a replicated version of the first table generated at a time of replication. The first process may further be configured to receive, from the second database system, the time of replication; and cause the first database system to operate with a version of the first table at the time of replication.

Also alternatively, or in addition, a first row of the plurality of first rows is different from a corresponding second row of the plurality of second rows and the executable code is SQL code configured to update a primary key of the first row. The SQL code may be configured to update a primary key of the first row to itself. A first row of the plurality of first rows may have no corresponding second row in the plurality of second rows and the executable code may be SQL code configured to update a primary key of the first row. The SQL code may be configured to update a primary key of the first row to itself. A second row of the plurality of second rows may have no corresponding first row in the plurality of first rows and the executable code may be SQL code configured to delete the second row from the second table.

Further alternatively, or in addition, the second database system is of a different type than the first database system. At least one of the first database system and the second database system may be a cloud-based database system.

Alternatively, or in addition, the first table includes partitions, and the first table is separated into first chunks based on partition boundaries.

In accordance with yet another embodiment of the present invention, a non-transitory computer-readable medium has software encoded thereon. The software, when executed by one or more processors, is operable to separate, by a computing device, a first table in a first database provided by a first database system into a plurality of first chunks, each first chunk including a plurality of first rows. The software is operable to separate, by the computing device, a second table in a second database provided by a second database system into a plurality of second chunks, each second chunk including a plurality of second rows, wherein each one of the plurality of second chunks corresponds to one of the plurality of first chunks. The software is operable to, for each first chunk of the plurality of first chunks, cause, by the computing device, the first database system to compute a first hash based on the first chunk. The software is operable to, for each first chunk of the plurality of first chunks, cause, by the computing device, the second database system to compute a second hash based on the second chunk. The software is operable to, for each first chunk of the plurality of first chunks, receive, by the computing device, the first hash from the first database system and the second chunk from the second database system. The software is operable to, for each first chunk of the plurality of first chunks, compare, by the computing device, the first hash with the second hash. The software is operable to, for each first chunk of the plurality of first chunks and in response to a determination that the first hash is different from the second hash, retrieve, by the computing device, the plurality of first rows of the first chunk and the plurality of second rows of the second chunk, and compare, by the computing device, the plurality of first rows to the plurality of second rows. The software is operable to, for each first chunk of the plurality of first chunks and in response to a determination that the plurality of first rows is different from the plurality of second rows, generate, by the computing device, executable code configured to reconcile the first table with the second table.

BRIEF DESCRIPTION OF THE DRAWINGS

The description below refers to the accompanying drawings, of which.

DETAILED DESCRIPTION OF ILLUSTRATIVE EMBODIMENTS

Figure 1:
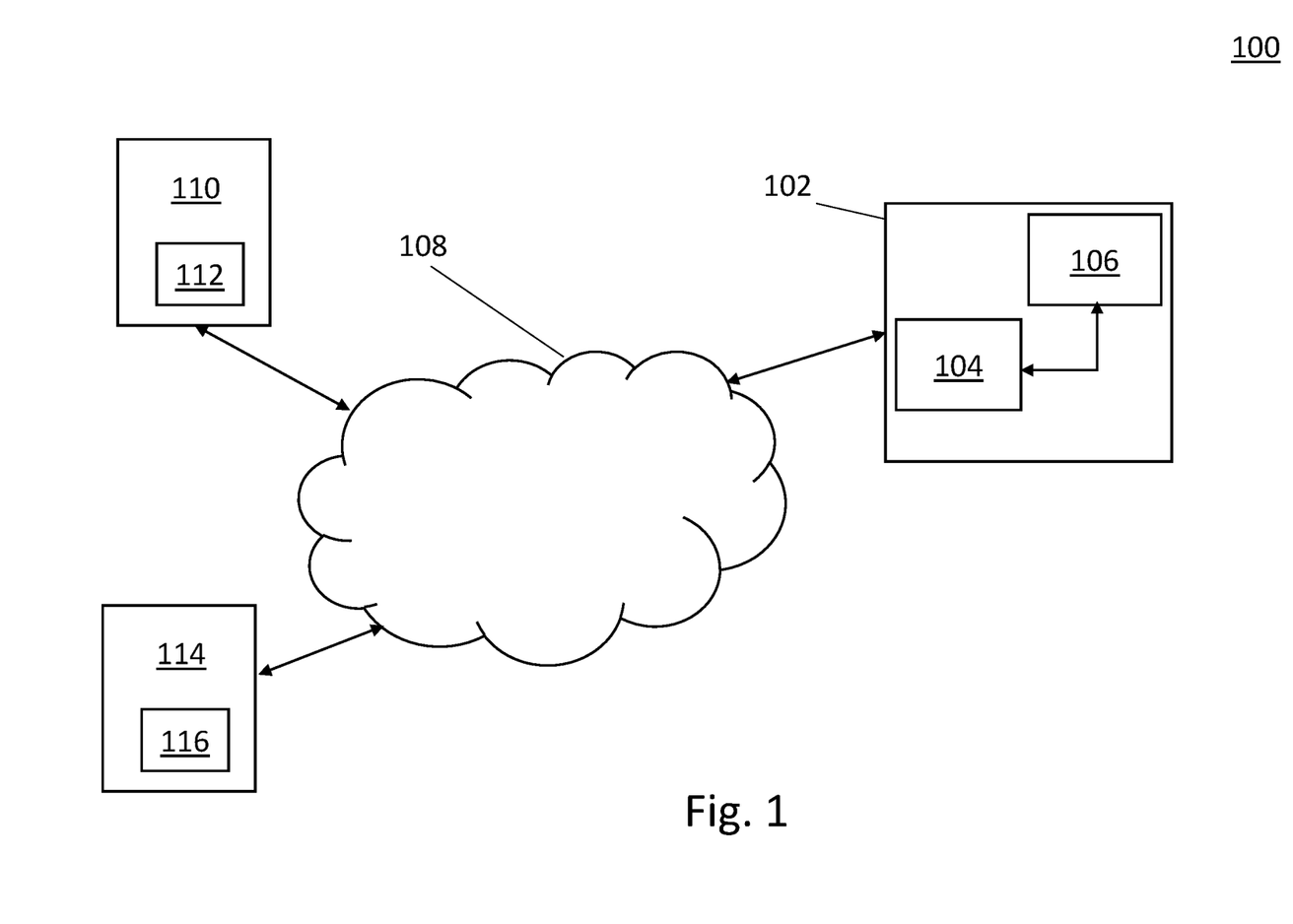
FIG. 1 is an illustration of a system for reconciling data in accordance with an embodiment of the present invention.

FIG. 1 is an illustration of a system 100 for reconciling data in accordance with an embodiment of the present invention. System 100 includes a computing device 102. The computing device 102 has a processor 104 coupled to a memory 106. The computing device 102 is also communicatively coupled to a communications network 108. Network 108 may be a public network, such as the internet, or it may be a private network, such as a network internal to a company. Network 108 also may be a combination of public and/or private networks. The computing device 102 may be coupled to the network 108 directly, for example via an Ethernet cable or via wireless connection such as Wi-Fi. Computing device 102 may also be coupled to the network 108 in any other way known to the skilled person, for example indirectly through another device (not shown), such, as, but not limited to, a router, a switch, a hub, a separate computer system, a mobile device, a modem, and/or a combination of these devices. The processor 104 is configured to execute portions of the method described below in detail with reference to FIG. 2.

Further coupled to the network 108 is a first database system 110. The first database system 110 provides a first database 112. Similar to the computing device 102, the first database system 110 may be coupled to the network 108 directly or indirectly in any way known to the skilled person. The first database 112 may be a part of the first database system 110 as shown, but it may also be communicatively coupled to the first database system 110, for example over the network 108. The first database system 110 is configured to store data in the database 112 and to retrieve data from the database 112.

Also coupled to the network 108 is a second database system 114. The second database system 114 provides a second database 116. Similar to the computing device 102 and the first database system 110, the second database system 114 may be coupled to the network 108 directly or indirectly in any way known to the skilled person. The second database 116 may be a part of the second database system 114 as shown, but it may also be communicatively coupled to the second database system 114, for example over the network 108. The second database system 114 is configured to store data in the database 116 and to retrieve data from the database 116. The second database system 114 may be of a different type than the first database system 110. For example, the first database system 110 may be an Oracle database system (Oracle Corp., Austin, TX), and the second database system may be a Microsoft SQL Server database system (Microsoft Corp., Redmond, WA). In other embodiments, the first database system 110 and the second database system 114 may be of the same type. One or both of the first and second database systems 110 and 114 may be a cloud-based database system as known to the skilled person. For example, the second database system 114 may be a Snowflake database system (Snowflake Inc., Bozeman, MT).

Figure 2:
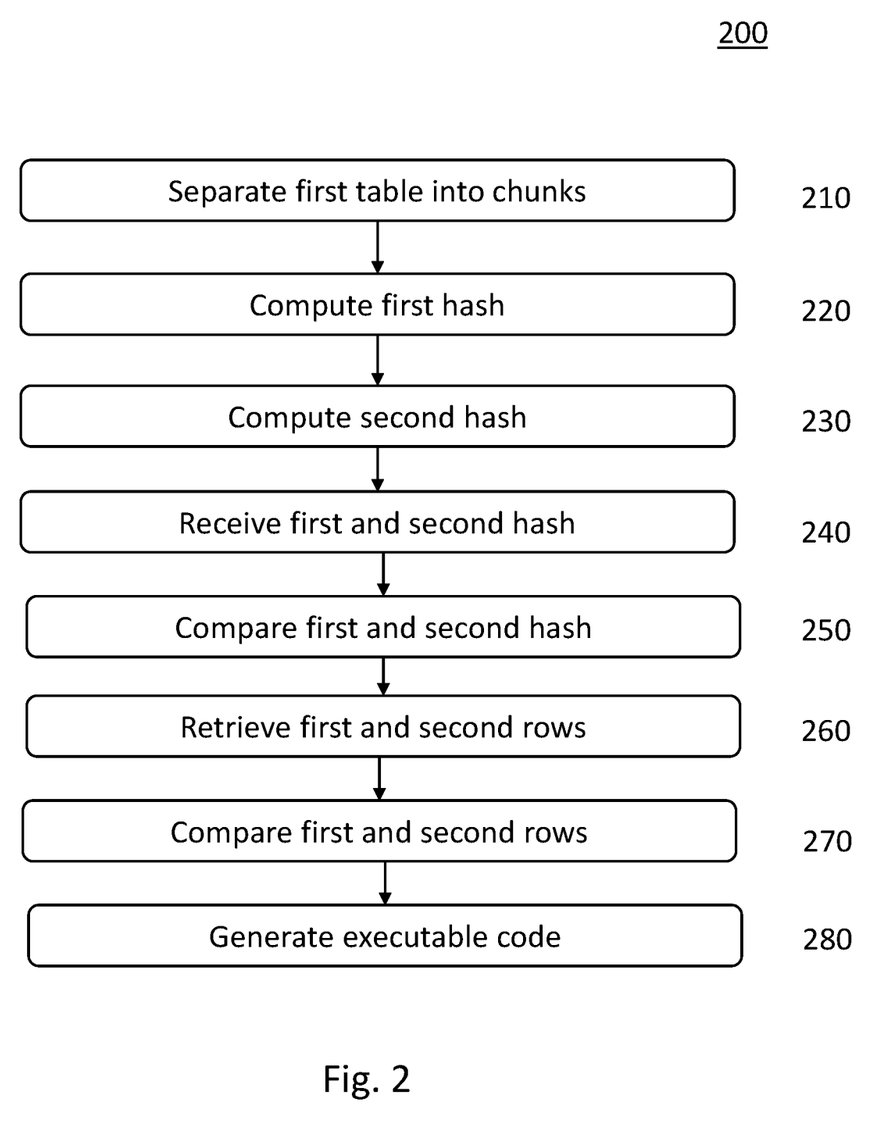
FIG. 2 is a flowchart of a method for reconciling data in accordance with an embodiment of the present invention.

FIG. 2 is a flowchart of a computer-implemented method 200 for reconciling data in accordance with an embodiment of the present invention. The computer-implemented method 200 may, for example, be executed by a processor of a computing device 102 as described above with reference to FIG. 1. Similar to what is described above, the computing device is coupled to a communications network 108. Also coupled to the communications network are a first database system 110 providing a first database 112 and a second database system 114 providing a second database 116. The first database 112 includes a first table, and the second database 116 includes a second table. The computer-implemented method reconciles the first table in the first database 112 with the second table in the second database 116. As known to the skilled person, the data in the first and second tables is organized in rows and columns. The first database system 110 and the second database system 114 may be of different types.

In some embodiments, the second table may be a replicated version of the first table generated at a time of replication. Illustratively, a replication process may periodically replicate the first table to the second table. Because errors may occur during replication, the data in the second table is not always guaranteed to be an exact copy of the data in the first table. The method described herein allows to find and correct any replication errors that may have occurred. If the second table is a replicated version of the first table, a time of replication may also be stored in the second database system 114 as a part of the replication process. The time of replication may represent the time at which the replication process was performed. The computing device 102 then receives the time of replication from the second database system 114 as part of method 200. In some embodiments, the first database system 110 provides the ability to access the data in the first table at the time of replication even if it has been modified since that time. In other words, the first database system 110 provides the ability to flashback or "time travel." In that case, the computing device 102 may cause the first database system to operate with a version of the first table at the time of replication. This "time travel" also allows to use the method 200 on a first database that may be changing during execution of the method.

In step 210, the computing device 102 separates the first table into a plurality of first chunks. Each one of the plurality of first chunks includes a plurality of first rows. If the first table includes partitions, the table is advantageously separated based on partition boundaries. For example, the first table may be portioned by date ranges. In that case, each first chunk may correspond to one of the partitions having data from a certain date range. If no partitioning is present in the first table, then the first table may be separated into chunks based on its primary key. In an illustrative example, the first table may be separated into first chunks based on a portion of the primary key, such as the hexadecimal value of the first character of the most selective part of the primary key. In that case, this hexadecimal value may be any of 0, 1, 2, 3, 4, 5, 6, 7, 8, 9, 0, A, B, C, D, E, F, and X (X is used for rows where no primary key is found). This splits the first table into 16 or 17 first chunks, depending on whether all rows have a primary key or not.

Alternatively, the first table may be separated into first chunks based on a different column from the primary key, for example when no primary key column is present. For example, the first table may be split based on a date column. Similarly, the first table may be split based on a substitute partitioning key. This allows, for example, to define date ranges for reconciliation. Illustratively, the method 200 may only reconcile the data in a selected date range, such as last week's data. In general, the method 200 may split the first table into first chunks that each have about a million to five million rows.

In step 220, the computing device 102 separates the second table into a plurality of second chunks. Each one of the plurality of second chunks includes a plurality of second rows. In addition, the second table is separated such that each one of the plurality of second chunks corresponds to one of the plurality of first chunks. This may, for example, be achieved by using the same chunking criteria as for the first table. If the first table was separated into chunks based on partitioning, the second table may also be separated based on the same partitioning. If the first table was separated into chunks based on a portion of its primary key, the second table may also be separated based on the same or a corresponding portion of its primary key. If the first table was separated based on a different column, the second table may also be separated based on the same or a corresponding column. It is further expressly contemplated that the first and second tables are separated based on different boundaries or columns, as long as the separation ensures that each second chunk of the plurality of second chunks corresponds to a first chunk of the plurality of first chunks. Illustratively, the first table may be partitioned based on dates, and the second table may not be partitioned. In that case, the first table may be separated based on the partitioning key, and the second table may be separated based on a corresponding date column.

After the computing device 102 has caused the separation of the first table into a plurality of first chunks, the computing device 102 performs the following steps 220-280 for each first chunk of the plurality of first chunks. The steps 220-280 may be performed in parallel to reduce processing time. In other words, the method may process some or all of the first chunks in the plurality of first chunks in parallel at the same time. Illustratively, steps 220-280 may be performed in parallel as threads.

In step 220, the computing device 102 causes the first database system 110 to compute a first hash based on the first chunk. The first hash is computed by the first database system 110 without transferring the data in the first chunk to the computing device 102. In other words, the only data transferred during this step is a command sent from the computing device 102 to the first database system 110 to compute the first hash. The computing device 102 may cause the first database system 110 to compute the first hash in any way known to the skilled person, such as through an application programming interface (API) or a command line tool. The first hash may be computed using any suitable hashing algorithm known to the skilled person, as long as the same hashing algorithm is used for both the first database system 110 and the second database system 114. Illustratively, in order to compute the hash, the first database system 110 converts the rows in the first chunk to a single string. Each row in the first chunk is converted to a string, and then the strings are processed such that one single string results for the entire first chunk. For example, each one of the strings may be hashed using any known and suitable hashing algorithm, and then the strings may be combined using an exclusive or (XOR) operation so that one single hash results for the entire first chunk. To ensure that the produced hash is independent of the type of the first database system 110, it is important that the string representation of the data in the first chunk is consistent across different types of database systems. A column formatter may be used for each column of each row to ensure that the string representation of that column, and therefore the string representation of the whole chunk, is consistent. The column formatter is adapted to the respective type of database system. Using this approach ensures that a date value in, for example, an Oracle database is converted to the exact same string as a date value in a Microsoft SQL Server database. The column formatter may also take into account different character encodings. For example, the column formatter may handle text encoded in UTF8 differently from text encoded in Windows-1252. Column formatters also simplify copying data from one database system to another database system when the data types available in the two database systems do not correspond exactly to one another.

Illustratively, a column formatter may receive data having the type of VARCHAR2 having UTF8 character encoding from an Oracle database system. The column formatter then converts that character data in the VARCHAR2 field to a string having Windows-1252 encoding before the hash is computed. The column formatter may also receive data having the type of DATE from the Oracle database system. The column formatter then may convert the date data to a string with the format "YYYY-MM-DD HH24:MI:SS", representing the date and time encoded in the original data. Other numbers received from the database may similarly be converted to strings using defined formats. In another example, the column formatter may not convert data from a data field having the type CHAR, but simply pass it on to the hash generator. For a binary object in the database, the column formatter may generate its own hash that represents the binary object. This hash for the binary object is then added to the string and used to compute the overall hash for the chunk.

In step 230, the computing device 102 causes the second database system 114 to compute a second hash based the second chunk from the plurality of second chunks that corresponds to the first chunk. As in step 220, the second database system 114 computes the second hash without transferring the data in the second chunk to the computing device 102. The hash may be computed in any way known to the skilled person. The only data transferred during this step is a command sent from the computing device 102 to the second database system 114 to compute the second hash. The computing device 102 may cause the first database system 114 to compute the second hash in any way known to the skilled person, such as through an API or a command line tool. Similar to what is described above with reference to step 220, the second database system 114 may compute the second hash by converting the data in the second chunk to a single hash. The second database system 114 may also use a column formatter to ensure that the same string is generated for the same data from different types of database systems.

In step 240, the computing device 102 receives the first hash from the first database system 110 and the second hash from the second database system 114. The first and second hashes may be received in any way known to the skilled person. For example, if the computing device 102 caused the database system to compute the hash using an API, the computing device 102 may received the hash through the same API. If the computing device 102 caused the database system to compute the hash using a command line tool, the computing device 102 may receive the hash as an output of the command line tool.

In step 250, the computing device 102 compares the first hash with the second hash to determine if they are equal. Because column formatters were used to convert the data in the first and second chunks to strings, as described above, the first hash and the second hash are the same if the data in the first chunk is the same as the data in the corresponding second chunk. In other words, if the first hash is the same as the second hash, the data in the second chunk is an exact replication or copy of the data in the first chunk.

If the first hash is not the same as the second hash, in step 260 the computing device 102 retrieves the plurality of first rows of the first chunk. The computing device 102 may retrieve the first rows from the first database system 110 using an API call, a command line application, or any other method known to the skilled person. Similarly, the computing device 102 retrieves the plurality of second rows of the second chunk from the second database system 114.

In step 270, the computing device 102 compares the plurality of first rows to the plurality of second rows. As described above with reference to computing the first and second hashes, the computing device 102 (and/or the first database system 110 and the second database system 114) may use column formatters to ensure that the same data retrieved from different types of database systems appears identical to the computing device 102. Since the first hash being different from the second hash means that at least one row of the plurality of first rows is different from its corresponding row of the plurality of second rows, this step now allows the method to determine which row is different from its corresponding row and what the difference is. The comparison of the first rows to the second rows also allows the method to determine if there is a first row that has no corresponding second row and/or a second row that has no corresponding first row.

In step 280, the computing device 102 generates executable code that is configured to reconcile the first table with the second table. The executable code may, for example, be Structured Query Language (SQL) code. In an example, the SQL code may be adapted to the second database system 114 and may be configured to instruct the second database system 114 to modify the data in a certain row of the second table. In another example, the SQL code may be adapted to the first database system 110 and may be configured to instruct the first database system 110 to modify the data in a certain row of the first table. In a database that includes time stamps representing when a row was last modified, the executable code may also be configured to update the primary key of the data in a row of the first table to itself so that a new time stamp is generated. The new time stamp then ensures that the replication process, when it is executed the next time, replicates this row to the second table so that the corresponding row in the second table is corrected. Similarly, the executable code may be configured to update the primary key to itself if a first row has no corresponding second row. The replication process then later replicates the first row to the second table so that the corresponding second row is created. In other embodiments, the executable code may be configured to instruct the first database system 110 or the second database system 114 to add a row of data or delete a row of data. For example, if a second row has no corresponding first row, the executable code may be configured to delete that second row from the second table.

As stated above, the chunking of the first and second databases, the parallel processing of the chunks, and the hashing of the chunks allow the method 200 to process large tables in a short time. For example, a table with 10,629,348 rows was separated into three chunks having 2,244,849, 6,781,691, and 9,834,858 rows respectively, based on a date partition key. The method described herein reconciled the table in 1 minute and 51 seconds The method may also store information about any chunks that fail the comparison in a separate table for later review and processing.

Figure 3:
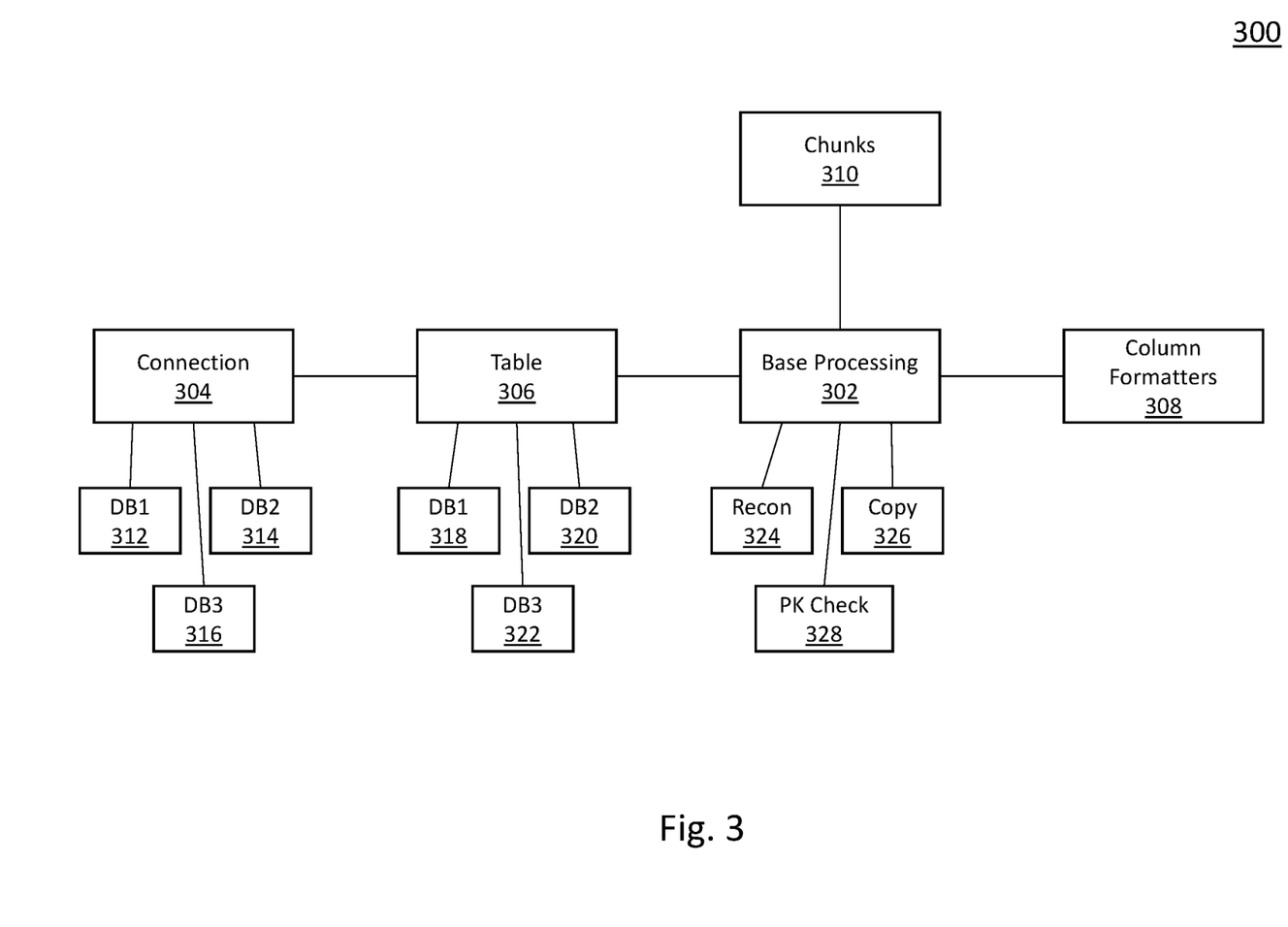
FIG. 3 is a block diagram of a software architecture configured to perform a method for reconciling data in accordance with an embodiment of the present invention.

FIG. 3 is a block diagram of a software architecture 300 configured to perform a method for reconciling data in accordance with an embodiment of the present invention. The software architecture 300 may, for example, be configured to perform the method 200 described in detail above with reference to FIG. 2. The software architecture may exemplarily be executed by the system 100 described in detail above with reference to FIG. 1.

The modular architecture 300 ensures that support for new database system types and/or new operations to perform on the databases may be added easily. The base processing module 302 provides the functionality common to all database types and to all operations. It also communicates with the other modules that are specific for certain database types and/or certain operations. The base processing module 302, for example, provides the functionality to separate a table into chunks 310. The base processing module 302 also controls the parallelism and overall function of the system, such as establishing a separate thread for each one of a number of chunks so that they can be processed in parallel.

The connection module 304 provides functionality that is required to establish a connection to a database system and to communicate with that database system while the connection is established. The connection modules 304 includes common code to perform these functions, but it also relies on specialized connection submodules that specify how to connect to a certain type of database. For example, connection submodule 312 may provide functionality to connect to a database system of a first type. In an example, the submodule 312 may allow the software to connect to a database provided by an Oracle database system. Connection submodule 314 may provide functionality to connect to a database system of a second type, different from the first type. For example, the submodule 314 may allow the software to connect to a database provided by a Microsoft SQL Server database system. Connection submodule 316 may provide functionality to connect to a database system of a third type, different from the first and the second types. For example, the submodule 316 may allow the software to connect to a cloud database provided by a Snowflake database system. As described above, the submodules 312, 314, and 316 may connect to their respective database systems over any connection known to the skilled person, including an internet connection to a database hosted in the cloud. When a connection to a new type of database system is required, it is easy to add a new submodule that is specific for that new type of database system and that extends the functionality of connection module 304.

The table module 306 provides functionality that is common to perform certain operations on a table in a database. For example, the table module 306 may provide functionality to retrieve a list of columns from the table, retrieve the table's primary key, add rows to the table, delete rows from the table, etc. The table module 306 has submodules 318, 320, and 322 that include executable SQL code configured to perform the functionality of the table module 306 on a certain database system type. Using the same example as above, submodule 318 may include SQL code for an Oracle database, submodule 320 may include SQL code for a Microsoft SQL Server database, and submodule 322 may include SQL code for a Snowflake database. While SQL code is described herein, it is expressly contemplated that any other executable code may be used to map the functionality of the table module 306 to a specific type of database system. If the database system does not support SQL queries, a different query language may be used. Similar to the connection module 304, when operation on a new type of database system is desired, it is easy to add a new submodule that is specific for that new type of database system and that extends the functionality of table module 306.

The architecture 300 also includes column formatters 308. The column formatters 308 ensure that different data types in different database systems are handled correctly and consistently, as described in detail above with reference to FIG. 2. The column formatters 308 are connected to the base processing module 302 and may be called from the base processing module 302.

The base processing module 302 may be extended by modules that perform specific functions on the database. Illustratively, the architecture 300 provides three different functionalities that are implemented by modules that extend base processing module 302. Exemplarily, the reconciliation module 324 provides functionality to perform a database-to-database reconciliation, as described above. The reconciliation module 324 therefore includes specific executable code configured to perform its specific function. The code is independent of the type of the database system it operates on and does not need to be modified when a new database system type is added, because all database-specific operations are performed by the submodules of the connection module 304 and the table module 306. Other examples for modules that extend the functionality of the base processing module 302 are the copy module 326 and the primary key check module 328. The copy module 326 provides functionality to bulk copy data from one database to another, and the primary key check module 328 provides functionality to confirm that the primary keys in a table are unique. The modular architecture allows for adding new functionality as desired by providing a new functionality module that extends the base processing module 302.

Exemplarily, the modules of architecture 300 may be implemented as classes in an object-oriented programming language. In that case, the submodules 312, 314, and 316 are classes that extend the base connection class of module 304. The submodules 318, 320, and 322 are classes that extend the base table class of module 306. The functionality modules 324, 326, and 328 are classes that extend the base processing class of module 302. This makes it easy to add a new class for a new database system and to add a new class that provides new processing functionality.

Embodiments of the present invention may be embodied in many different forms, including, but in no way limited to, computer program logic for use with a processor (e.g., a microprocessor, microcontroller, digital signal processor, or general purpose computer), programmable logic for use with a programmable logic device (e.g., a Field Programmable Gate Array (FPGA) or other PLD), discrete components, integrated circuitry (e.g., an Application Specific Integrated Circuit (ASIC)), or any other means including any combination thereof.

Computer program logic implementing all or part of the functionality previously described herein may be embodied in various forms, including, but in no way limited to, a source code form, a computer executable form, and various intermediate forms (e.g., forms generated by an assembler, compiler, networker, or locator.) Source code may include a series of computer program instructions implemented in any of various programming languages (e.g., an object code, an assembly language, or a high-level language such as Fortran, C, C++, JAVA, Python, or HTML) for use with various operating systems or operating environments. The source code may define and use various data structures and communication messages. The source code may be in a computer executable form (e.g., via an interpreter), or the source code may be converted (e.g., via a translator, assembler, or compiler) into a computer executable form.

The computer program may be fixed in any form (e.g., source code form, computer executable form, or an intermediate form) either permanently or transitorily in a tangible storage medium, such as a semiconductor memory device (e.g., a RAM, ROM, PROM, EEPROM, or Flash-Programmable RAM), a magnetic memory device (e.g., a diskette or fixed disk), an optical memory device (e.g., a CD-ROM, a PC card (e.g., PCMCIA card), or other memory device. The computer program may be fixed in any form in a signal that is transmittable to a computer using any of various communication technologies, including, but in no way limited to, analog technologies, digital technologies, optical technologies, wireless technologies, networking technologies, and internetworking technologies. The computer program may be distributed in any form as a removable storage medium with accompanying printed or electronic documentation (e.g., shrink wrapped software or a magnetic tape), pre-loaded with a computer system (e.g., on system ROM or fixed disk), or distributed from a server or electronic bulletin board over the communication system (e.g., the Internet or World Wide Web).

Hardware logic (including programmable logic for use with a programmable logic device) implementing all or part of the functionality previously described herein may be designed using traditional manual methods, or may be designed, captured, simulated, or documented electronically using various tools, such as Computer Aided Design (CAD), a hardware description language (e.g., VHDL or AHDL), or a PLD programming language (e.g., PALASM, ABEL, or CUPL).

The foregoing description described certain example embodiments. It will be apparent, however, that other variations and modifications may be made to the described embodiments, with the attainment of some or all of their advantages. Accordingly, the foregoing description is to be taken only by way of example, and not to otherwise limit the scope of the disclosure. It is the object of the appended claims to cover all such variations and modifications as come within the true spirit and scope of the disclosure.

What is claimed is:

1. A computer-implemented method for reconciling a first table in a first database provided by a first database system with a second table in a second database provided by a second database system, the method comprising:
    separating, by a computing device communicatively coupled to the first database system and to the second database system, the first table into a plurality of first chunks, each first chunk including a plurality of first rows;
    separating, by the computing device, the second table into a plurality of second chunks, each second chunk including a plurality of second rows, wherein each one of the plurality of second chunks corresponds to one of the plurality of first chunks;
    converting, by the computing device, data values in one or more columns in the plurality of first chunks from a first data type adapted to the first database into a database-independent first data type;
    converting, by the computing device, data values in one or more columns in the plurality of second chunks from a second data type adapted to the second database into a database-independent second data type; and
    for each first chunk of the plurality of first chunks:
        causing, by the computing device, the first database system to compute a first hash based on the first chunk;
        causing, by the computing device, the second database system to compute a second hash based on a second chunk from the plurality of second chunks corresponding to the first chunk;
        receiving, by the computing device, the first hash from the first database system and the second hash from the second database system;
        comparing, by the computing device, the first hash with the second hash;
        in response to a determination that the first hash is different from the second hash, retrieving, by the computing device, the plurality of first rows of the first chunk and the plurality of second rows of the second chunk, and comparing, by the computing device, the plurality of first rows to the plurality of second rows; and
    in response to a determination that the plurality of first rows is different from the plurality of second rows, generating, by the computing device, executable code configured to reconcile the first table with the second table.

2. The computer-implemented method of claim 1, wherein the second table is a replicated version of the first table generated at a time of replication.

3. The computer-implemented method of claim 2, further comprising:
    receiving, by the computing device from the second database system, the time of replication; and
    causing, by the computing device, the first database system to operate with a version of the first table at the time of replication.

4. The computer-implemented method of claim 1, wherein a first row of the plurality of first rows is different from a corresponding second row of the plurality of second rows and wherein the executable code is SQL code configured to update a primary key of the first row.

5. The computer-implemented method of claim 1, wherein a first row of the plurality of first rows has no corresponding second row in the plurality of second rows and wherein the executable code is SQL code configured to update a primary key of the first row.

6. The computer-implemented method of claim 1, wherein a second row of the plurality of second rows has no corresponding first row in the plurality of first rows and wherein the executable code is SQL code configured to delete the second row from the second table.

7. The computer-implemented method of claim 1, wherein at least one of the first database system and the second database system is a cloud-based database system.

8. The computer-implemented method of claim 1, wherein the first table includes partitions and wherein the first table is separated into first chunks based on partition boundaries.

9. The computer-implemented method of claim 1, wherein the first table includes a primary key and wherein the first table is separated into first chunks based on a portion of the primary key.

10. A system for reconciling data, the system comprising:
a first database system providing a first database having a first table;
a second database system providing a second database having a second table;
a computing device communicatively coupled to the first database system and the second database system and having a first processor coupled to a first memory, the first processor configured to:
separate the first table into a plurality of first chunks, each first chunk including a plurality of first rows;
separate the second table into a plurality of second chunks, each second chunk including a plurality of second rows, wherein each one of the plurality of second chunks corresponds to one of the plurality of first chunks;
convert, by the computing device, data values in one or more columns in the plurality of first chunks from a first data type adapted to the first database into a database-independent first data type;
convert, by the computing device, data values in one or more columns in the plurality of second chunks from a second data type adapted to the second database into a database-independent second data type; and
for each first chunk of the plurality of first chunks:
cause the first database system to compute a first hash based on the first chunk;
cause the second database system to compute a second hash based on a second chunk from the plurality of second chunks corresponding to the first chunk;
receive the first hash from the first database system;
receive the second hash from the second database system;
compare the first hash with the second hash;
in response to a determination that the first hash is different from the second hash, retrieve the plurality of first rows of the first chunk and the plurality of second rows of the second chunk, and compare the plurality of first rows to the plurality of second rows; and
in response to a determination that the plurality of first rows is different from the plurality of second rows, generate executable code configured to reconcile the first table with the second table.

11. The system of claim 10, wherein the first processor is further configured to: receive, from the second database system, the time of replication; and cause the first database system to operate with a version of the first table at the time of replication.

12. The system of claim 10, wherein a first row of the plurality of first rows is different from a corresponding second row of the plurality of second rows and wherein the executable code is SQL code configured to update a primary key of the first row.

13. The system of claim 10, wherein a first row of the plurality of first rows has no corresponding second row in the plurality of second rows and wherein the executable code is SQL code configured to update a primary key of the first row.

14. The system of claim 10, wherein a second row of the plurality of second rows has no corresponding first row in the plurality of first rows and wherein the executable code is SQL code configured to delete the second row from the second table.

15. The system of claim 10, wherein at least one of the first database system and the second database system is a cloud-based database system.

16. The system of claim 10, wherein the first table includes partitions and wherein the first table is separated into first chunks based on partition boundaries.

17. A non-transitory computer-readable medium having software encoded thereon, the software, when executed by one or more processors operable to:
separate, by a computing device, a first table in a first database provided by a first database system into a plurality of first chunks, each first chunk including a plurality of first rows;
separate, by the computing device, a second table in a second database provided by a second database system into a plurality of second chunks, each second chunk including a plurality of second rows, wherein each one of the plurality of second chunks corresponds to one of the plurality of first chunks;
convert, by the computing device, data values in one or more columns in the plurality of first chunks from a first data type adapted to the first database into a database-independent first data type;
convert, by the computing device, data values in one or more columns in the plurality of second chunks from a second data type adapted to the second database into a database-independent second data type; and
for each first chunk of the plurality of first chunks:
cause, by the computing device, the first database system to compute a first hash based on the first chunk;
cause, by the computing device, the second database system to compute a second hash based on the second chunk;
receive, by the computing device, the first hash from the first database system and the second chunk from the second database system;
compare, by the computing device, the first hash with the second hash;
in response to a determination that the first hash is different from the second hash, retrieve, by the computing device, the plurality of first rows of the first chunk and the plurality of second rows of the second chunk, and compare, by the computing device, the plurality of first rows to the plurality of second rows; and
in response to a determination that the plurality of first rows is different from the plurality of second rows, generate, by the computing device, executable code configured to reconcile the first table with the second table.

* * * * *